United States Patent [19]
Narikiyo et al.

[11] 4,138,633
[45] Feb. 6, 1979

[54] POSITION CONTROL APPARATUS FOR CIRCULAR TABLES

[75] Inventors: Yasumasa Narikiyo, Aichi; Osamu Baba, Nagoya, both of Japan

[73] Assignee: Okuma Machinery Works Ltd., Nagoya, Japan

[21] Appl. No.: 834,711

[22] Filed: Sep. 19, 1977

Related U.S. Application Data

[63] Continuation-in-part of Ser. No. 672,010, Mar. 30, 1976, abandoned.

[30] Foreign Application Priority Data

Apr. 3, 1975 [JP] Japan .................................. 50-41551

[51] Int. Cl.² .............................................. G05B 19/28
[52] U.S. Cl. .................................... 318/603; 318/664; 364/474
[58] Field of Search ............... 318/602, 664, 600, 603; 364/474

[56] References Cited

U.S. PATENT DOCUMENTS

| | | | |
|---|---|---|---|
| 3,333,089 | 7/1967 | Saylor et al. | 318/601 |
| 3,448,360 | 6/1969 | Pohl | 318/602 X |
| 3,564,379 | 2/1971 | Bakel et al. | 318/603 |
| 3,569,815 | 3/1971 | McNaughton | 318/664 X |
| 3,573,589 | 4/1971 | Berry | 318/601 |
| 3,826,964 | 7/1974 | Byrne | 318/664 X |
| 3,843,915 | 10/1974 | Helmbold | 318/602 |

Primary Examiner—B. Dobeck
Attorney, Agent, or Firm—Jay L. Chaskin

[57] ABSTRACT

An angular position control apparatus for a machine tool circular table comprises a circuit for discriminating whether a command from a command register is such that the output from an absolute position detector for the table passes over the figure zero and an angular converter for converting a present or stopped position of the table detected by the position detector into an angular value. The output of the angular converter is compared with the command to drive the circular table. The resulting compared difference controls the clockwise or counterclockwise rotation of the table and table rotation in the neighborhood of the figure zero of the position detector is smoothed.

3 Claims, 9 Drawing Figures

POSITION CONTROL APPARATUS FOR CIRCULAR TABLES

CROSS-REFERENCE TO RELATED APPLICATION

This is a continuation-in-part application of the co-pending U.S. application Ser. No. 672,010, filed Mar. 30, 1976 now abandoned.

LIST OF PRIOR ART REFERENCES (37 CFR 1.56 (a))

The following reference is cited to show the state of the art: British Pat. No. 1,421,272, T. Kimura, Jan. 14, 1976

BACKGROUND OF THE INVENTION

1. Field of the Invention

This invention relates to a control of a rotational angular position of a circular table by the use of an absolute position detector.

2. Description of the Prior Art

The conventional systems for controlling the rotational angular position of a circular table include two types; one using an incremental position detector and the other an absolute one. In the case of a power failure in the course of work or when the power supply is cut off due to a suspension of work, the control apparatus of the former system is unable to remember the present position of the circular table. At the time of resumption of work, therefore, the circular table has to be inconveniently returned to the origin. Another disadvantage of this sytem is that an angular command requires a special position detector for angular detection. On the other hand, the latter system has a disadvantage in that numerical values detectable by a position detector have a limitation, thus limiting the rotation of the circulation table in the same direction and the programming practice on the other.

SUMMARY OF THE INVENTION

Accordingly, it is an object of the present invention to provide a position control apparatus for circular tables wherein the circular table is limitlessly rotatable both clockwise and counterclockwise and the rotational control of the absolute position detector is smoothly effected in the neighborhood of the figure zero mark thereof, thus obviating the disadvantages of the conventional system.

Another object of the invention is to provide a position control apparatus for circular tables wherein, as an absolute position detector for detecting the present position of the circular table, an ordinary decimal position detector is used which has no limit in detectable numerical values, namely, which is rotatable limitlessly in either direction. The output of the decimal position detector is converted into an angular value and compared with another angular value associated with a command of table rotation. The resulting angular difference is used to drive the circular table appropriately.

DETAILED DESCRIPTION OF THE PREFERRED EMBODIMENTS

An embodiment of the invention will be described below with reference to the accompanying drawings.

Figure 1:
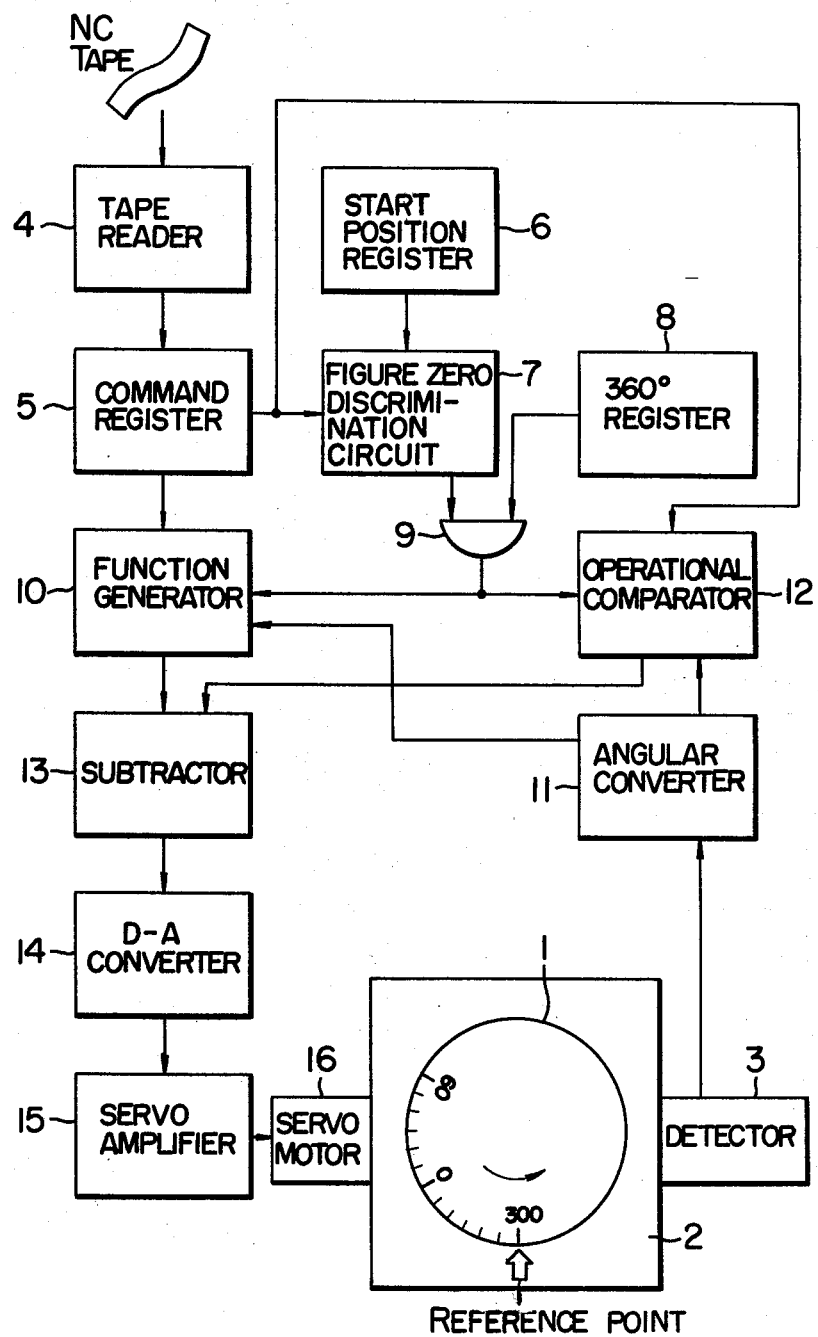
FIG. 1 is a block diagram according to the present invention.

Reference numeral 1 shows a circular table rotatable either clockwise or counterclockwise with respect to the base 2. An angular scale incremental clockwise as viewed in FIG. 1 is cut on the circular table 1. Numeral 3 shows an absolute position detector for detecting and producing a decimal value of the present position of the circular table with respect to the reference point on the base 2 as the table rotates. When the zero mark on the circular table coincides with the reference point on the base 2, figure zero is produced from the absolute position detector 3. The position detector 3 is so configured that upon completion of one rotation of the circular table starting at the figure zero on the position detector 3, the output of the position detector 3 returns from 0 to 0 through five-digit value 99999. No matter how many times the circular table rotates limitlessly, therefore, the position detector 3 produces the same output as long as the position of a given point on the circular table relative to the reference point on the table base 2 remains the same. Reference numeral 4 shows a tape reader for reading information provided in the form of a NC. Numeral 5 shows a command register for storing commmand information concerning a command position and the direction of rotation of the circular table 1 among all pieces of information read by the tape reader 4. Numeral 6 shows a start position register which, in response to an angular value representing the stop position of the circular table rotation received from the angular converter 11 (described later), stores such an angular value as a start position for resumption of rotation. Numeral 7 shows a figure zero discrimination circuit for discriminating, by comparison between the outputs of the command register 5 and the start position register 6, whether the command position is such that the output of the position detector 3 passes over the figure zero when the circular table rotates in the direction specified by the command. Only when the output of the detector 3 is beyond figure zero, a signal is produced from the figure zero discrimination circuit 7. Numeral 8 shows a 360° register for storing the angular value of 360° required at the time of production of a signal from the figure zero discrimination circuit 7. Numeral 9 shows an AND gate for passing the information in the 360° register 8 in response to a signal from the figure zero discrimination circuit 7. Numeral 10 shows a function generator to which are applied both the output of the command register 5 and the output of the angular converter 11 representing an angular value of the stop position of circular table rotation. This angular value is stored in the function generator 10 as a position at which rotation of the circular table is to be started from the stopped position. In the event that the angular value of 360° is applied to the function generator 10 from the 360° register 8, on the other hand, the function generator 10 adds the value of 360° to the angular value of the start position of circular table rotation if the command involves clockwise rotation; and subtracts 360° from it if the command is concerned with counterclockwise rotation. In both cases, the function generator 10 continuously produces instantaneous output signals associated with respective points in the course of rotation of the circular table from the angular value representing the start position to the command position. Numeral 11 shows an angular converter for converting the decimal value which is the output of the position detector 3 into an angular value. The detail of this angular converter 11 will be described later. Numeral 12 shows an operational comparator receiving both the output of the angular converter 11 and a command specifying the direction of circular table rotation. The operational comparator 12, when it does not receive the angular value of 360° from the 360° register 8, passes the output of the angular converter 11 directly to the subtractor 13. When comparator 12 receives the angular value of 360° from the 360° register 8, on the other hand, the operational comparator 12, before the output of the angular converter 11 passes over 0°, produces an output of the angular converter 11 adding 360° if the command involves clockwise rotation; and produces an output of the angular converter 11 subtracting 360° if the command involves counterclockwise rotation. In either case, the output of the operational comparator 12 is applied to the subtractor 13. When and after the output of the angular converter 11 passes over 0°, the output of the angular converter 11 is passed to the subtractor 13 without addition or subtraction. Numeral 13 shows a subtractor for producing the difference between the output of the function generator 10 and that of the operational comparator 12. Numeral 14 shows a D-A converter for converting the output of the subtractor 13 into an analog value. Numeral 15 shows a servo amplifier for driving a DC servo motor 16. Numeral 16 shows the DC servo motor for rotating the circular table.

Figure 2:
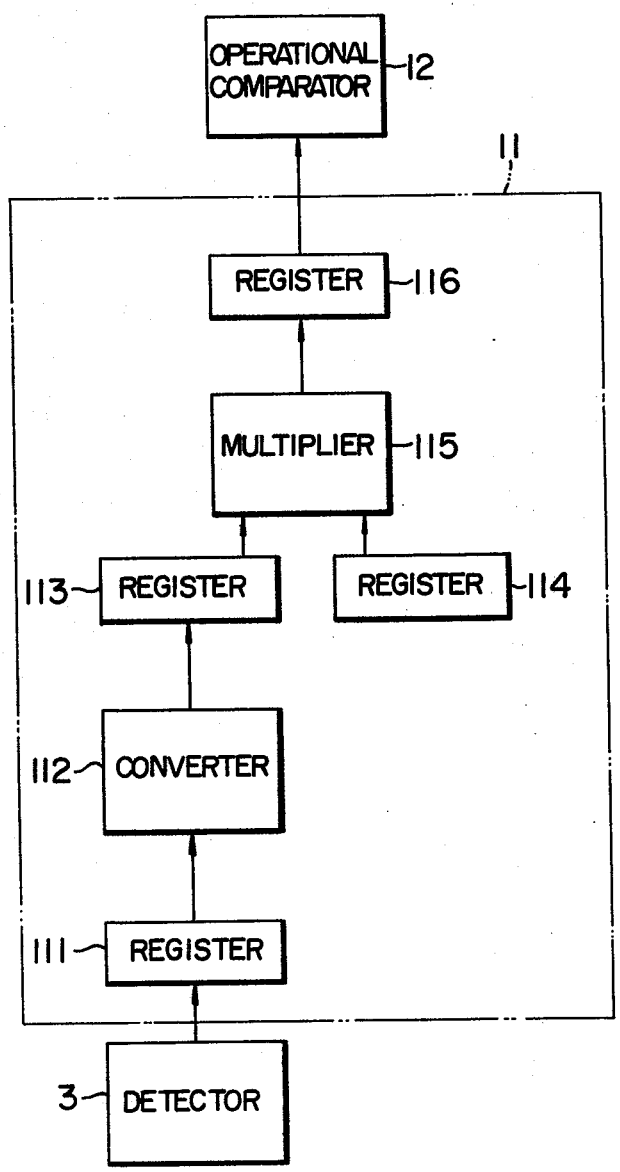
FIG. 2 is a block diagram detailing the angular converter in FIG. 1.

The angular converter 11 will be described more in detail below with reference to FIG. 2.

Numeral 111 shows a register for storing the output value of the detector 3. Numeral 112 shows a converter for converting the decimal value in the register 111 into a binary value. Numeral 113 shows a register for storing the output of the converter 112. Numeral 114 shows a register for storing an angular conversion factor K. Numeral 115 shows a multiplier for multiplying the output value of the register 113 by the factor K produced from the register 114, thus converting the output value of the detector 3 into an angular value. By the way, the greater the factor K, the more the number of digits of the output value of the multiplier 115, i.e., the less the angle for each digit, resulting in a better resolution of precision. Numeral 116 shows a register for storing the output of the multiplier 115, the output of the register 116 being applied to the operational comparator 12.

Thus, the element 11 is the angular converter for converting the decimal value produced from the absolute position detector 3 to the angular value in the range 0°-360°. It is also one of the advantages of the present invention that the conventional position detector for decimal notation can be utilized or applied to the present invention without using any specific and complex angular detector.

Figure 3:
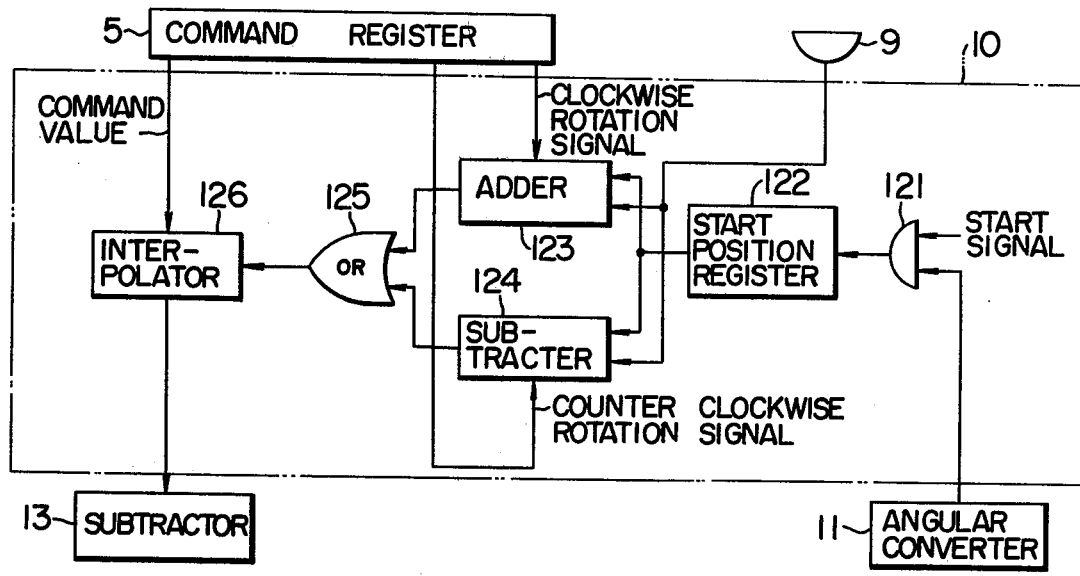
FIG. 3 shows a block diagram detailing the function generator in FIG. 1, in connection with relative other elements.

The function generator 10 will be described more in detail below with reference to FIG. 3.

Numeral 121 shows an AND gate for receiving a start signal and the output of the angular converter 11 and for outputting the Anded signal thereof to a start position register 122. The AND gate 121 operates to pass the output signal from the angular converter 11 to the register 122 in accordance with an existence of the start signal. Numeral 123 shows an adder for receiving the output signals from the start position register 122 and the AND gate 9 and a clockwise rotation signal from the command register 5, and for outputting the added results thereof to an OR gate 125. The adder 123 operates upon receiving the signal from the register 5. Numeral 124 shows a subtractor for receiving the output signals from the register 122 and the AND gate 9 and a counterclockwise rotation signal from the command register 5, and for outputting the subtracted results thereof to the OR gate 125. The subtractor 124 operates upon receiving the signal from the register 5. Numeral 126 shows an interpolation for receiving a value from the OR gate 125 and a command value from the command register 5 and for outputting the output of the interpolator 126 to the subtractor 13.

Figure 4:
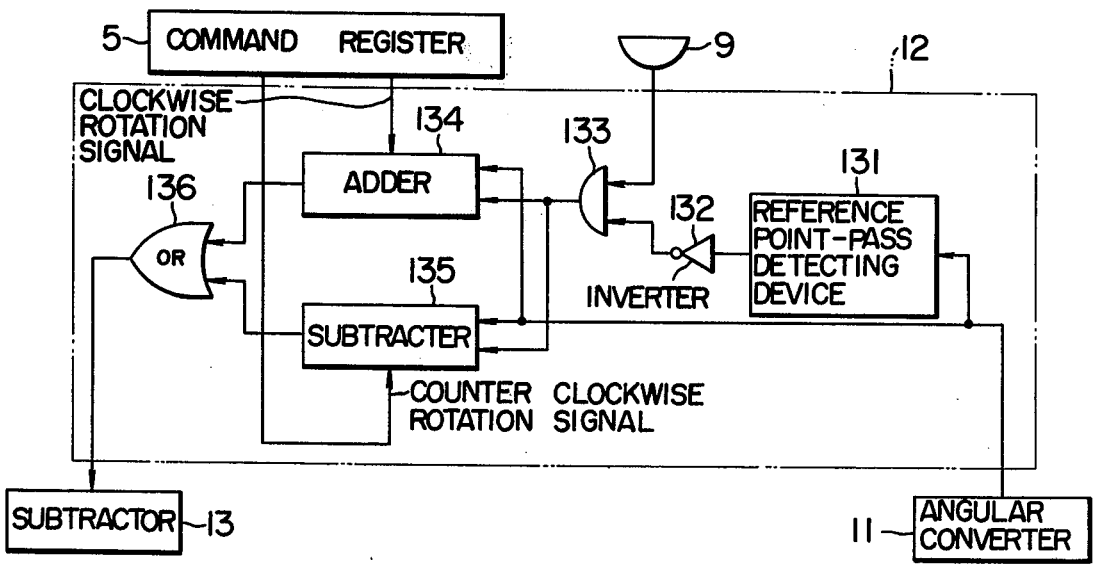
FIG. 4 shows a block diagram detailing the operational comparator in FIG. 1, in connection with relative other elements.

The operational comparator 12 will be described more in detail below with reference to FIG. 4.

Numeral 131 shows a reference point-pass detecting device for receiving an angular value from the angular converter and for outputting the detected results to an inverter 132. Numeral 133 shows an AND gate for passing the output of the AND gate 9 only when the output of the inverter 132 is high "1". Numeral 134 shows an adder for receiving signals from the AND gate 133, the angular converter 11, and the command register 5 for a clockwise rotation signal. The adder 134 operates only upon receiving the signal from the register 5. Numeral 135 shows a subtractor for receiving signals from the AND gate 133, the angular converter 11, and the command register 5 for a counterclockwise rotation signal. The subtractor 135 operates only upon receiving the signal from the register 5. Numeral 136 shows an OR gate for passing the output from the adder 134 or the subtractor 135 to the subtractor 13.

In this operational comparator 12, a reference point-pass detecting device 131 produces the output "1" when the output of the detector 3 has passed the figure zero, and the output "1" is maintained until the circular table rotates to a command value. When the zero mark on the table 1 is coincident with the reference point on the base 2, the output of the detector 3 becomes to zero, and the angular converter 11 is set so as to output zero in accordance with to the zero-output of the detector 3.

Figure 5:
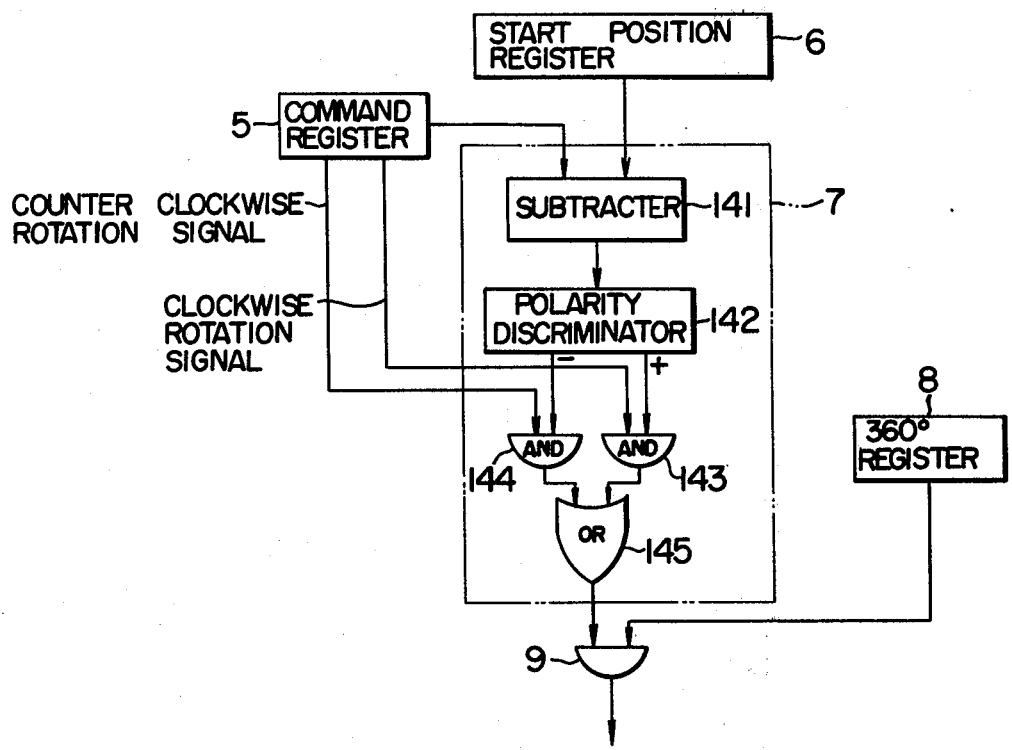
FIG. 5 shows a block diagram detailing the figure zero discrimination circuit in FIG. 1, in connection with relative other elements.

The figure zero discrimination circuit 7 will be described more in detail below with reference to FIG. 5.

Numeral 141 shows a subtractor for subtracting the output of the start position register 6 from the output of the command register 5 thereby to output the results to a polarity discriminator 142. Numeral 143 shows an AND gate for receiving the clockwise rotation signal from the command register 5 and outputting the output "1" to an OR gate 145 upon receiving the output "1" represented on the line of the positive polarity of a polarity discriminator 142 from the command register 5. Similarly numeral 144 shows an AND gate for receiving the counterclockwise rotation signal from the command register 5 and outputting the output "1" to the OR gate 145 upon receiving the output "1" appeared on the line of the negative polarity of the polarity discriminator 142. Numeral 145 shows an OR gate for passing the output "1" from the AND gate 143 or the output "1" from the AND 144 to the AND gate 9.

The operation of the angular position control apparatus for circular tables which is constructed as mentioned above will be described below.

A command specifying a command position and the direction of rotation of the circular table is transmitted from the NC tape through the tape reader 4 to and stored in the command register 5. The figure zero point discrimination circuit 7 receives both an output signal of the command register 5 representing the command position and the direction of rotation of the circular table 1, and an output of the start position register 6 representing the angular value of the starting position of the circular table 1. The circuit 7 thus detects whether the command position is such that the output of the position detector 3 passes over the figure zero point as the circular table 1 rotates until the command position is reached at the reference point on the table base in the specified direction. In the case where it passes over the figure zero, the circuit 7 applies a signal to the AND gate 9. In the presence of a signal from the figure zero discrimination circuit 7, the angular value of 360° is applied from the 360° register 8 through the AND gate 9 to the function generator 10 and the operational comparator 12. In this case, the function generator 10 receives both a signal from the command register 5 representing the command or target position and the direction of rotation of the circular table 1 and an output signal of the 360° register 8 repesenting the angular value of 360°. If the command is associated with clockwise rotation, the angular value of the start position is added to the angular value of 360°, whereas if the counterclockwise rotation is involved, the angular value of 360° is subtracted from the angular value representing the start position. In this way, the angular value of the start position with respect to the command position is continuously produced. The output at each instant in the course of table rotation is applied continuously to the subtractor 13 until it reaches the angular value of the command position. For example, assume that the circular table 1 is started at the angular position of 300°, that the command position is set to an angular value of 60°, for example, and that the circular table 1 is required to rotate counterclockwise, as shown in FIG. 1. Then, the angular value of the start position is changed to −60° as 300° − 360° = −60°, and signals produced at each instant in the course of rotation of the circular table 1, namely, −59°, −58°, −57°, ..., −1°, 0°, +1°, ..., +59° are applied to the subtractor 13 until the command position is reached at the reference point on the table base. On the other hand, the operational comparator 12 receives not only an angular value of the present position of the circular table 1 produced from the angular converter 11 but also information concerning the direction of table rotation produced from the command register 5. Further, the operational comparator 12, in response to the angular value of 360° applied from the 360° register 8, produces the angular value of the present position of the circular table 1 adding the angular value of 360° if the command specifies clockwise rotation; and produces the angular value of the present position of the circular table 1 subtracting the angular value of 360° if the command involves counterclockwise rotation. In both cases, the output of the operational comparator 12 is applied to the subtractor 13. When the angular value of the present position of the circular table 1 passes over 0°, however, the angular value of the present position of the circular table 1 is applied directly to the subtractor 13 without addition or subtraction of the angular value of 360°.

In the shown example, 360° is subtracted from the angular value of the present position, namely, 300° and the resulting angular value of −60° is applied to the subtractor 13. When, with the progress of control operation, the angular value of the present position of the circular table 1 applied from the angular converter 11 to the operational comparator 12 takes such a degree as 1° or 2° passing over 0°, however, such a value of 1° or 2° is applied directly to the subtractor 13. The subtractor 13 compares the output of the function generator 10 with the output of the operational comparator 12, and applies the difference therebetween to the D-A converter 14. The D-A converter 14 converts the input thereto into an analog value, and drives the DC servo motor 16 through the servo amplifier 15 for driving the circular table 1 in the direction shown by the arrow. The variation in the output of the position detector 3 causes corresponding variation in the output from the operational comparator 12 through the angular converter 11. In the meantime, the function generator 10 continues to produce a command at each instant for the circular table 1. The subtractor 13 compares this command with the output of the operational comparator 12 representing the angular value of the present position of the circular table 1. Until the difference between the two values compared as above becomes zero, the circular table 1 is kept driven, and stops when it becomes zero. In the absence of a signal from the figure zero point discrimination circuit 7, the function generator 10 uses the angular value of the start position of the circular table 1 provided by the angular converter 11 so that the output at each instant in the course of rotation of the circular table 1 is continuously applied to the subtractor 13 until it changes from the angular value representing the start position to the angular value of the command position. The operational comparator 12 passes the signal from the angular converter 11 directly to the subtractor 13. Subsequent operations of the subtractor 13, D-A converter 14, servo amplifier 15 and DC servo motor 16 are identical with those on the signal from the figure zero discrimination circuit 7 and will not be described again.

For better understanding, the interrelationship among the elements 10, 11, 12, 7, 131 and 9 is explained below in detail using four examples as shown in FIGS. 6A, 6B, 6C and 6D.

Figure 6A:
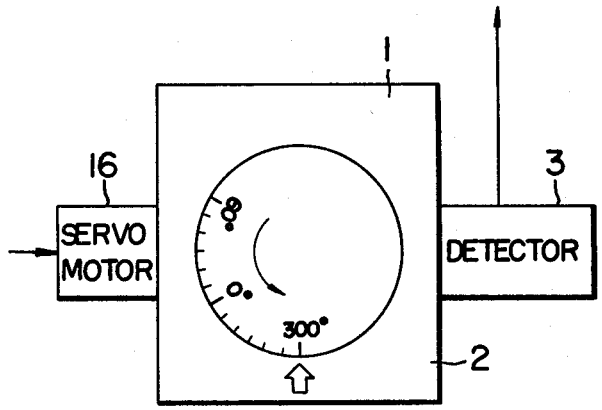
FIGS. 6A, 6B, 6C and 6D show respectively an initial position of the table in each of four examples for explaining an interrelationship among the element 10, 11, 12, 7, 131 and 9.

(1) In the case where the circular table 1 rotates in the counterclockwise direction, the reference point denoting the mark 300° in start position, and a command value being set as 60° as shown in FIG. 6A; the interrelationship among the elements 10, 11, 12, 7, 131 and 9 results in the following table.

| | | (300°) ↓ | | | | | |
|---|---|---|---|---|---|---|---|
| The output of the element | 10 | −60°, −59°, ......, −1°, | 0°, | 1°, | ......, 59°, | 60° |
| " | 11 | 300°, 301°, ......, 359°, | 0°, | 1°, | ......, 59°, | 60° |
| " | 12 | −60° −59°, ......, −1°, | 0°, | 1°, | ......, 59°, | 60° |
| " | 7 | 0 ⎯⎯⎯⎯⎯⎯⎯⎯⎯⎯⎯⎯⎯⎯⎯⎯⎯⎯⎯⎯⎯⎯ | | | | |
| " | 131 | ⎯⎯⎯⎯⎯⎯⎯⎯⎯⎯⎯⎯⎯⎯⎯⎯ | | | | |
| " | 9 | 360°, 360°, ......, 360°, | 360°, | 360°, | ......, 360°, | 360° |

Figure 6B:
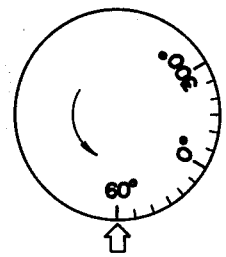

(2) In the case of the counterclockwise rotation of the table, the start position being 60° and the command position being 300°, as shown in FIG. 6B, the interrelationship as follows:

| | | (60°) ↓ |
|---|---|---|
| The output of the element | 10 | 60°, 61°, 62°, ......, 299°, 300° |
| " | 11 | 60°, 61°, 62°, ......, 299°, 300° |
| " | 12 | 60°, 61°, 62°, ......, 299°, 300° |
| " | 7 | |
| " | 131 | |
| " | 9 | 0°, 0°, 0°, ......, 0°, 0° |

Figure 6C:
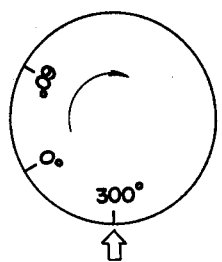

(3) In the case of the clockwise rotation of the table, the start position being 300° and the command position being 60°, as shown in FIG. 6C.

| | | (300°) ↓ |
|---|---|---|
| The output of the element | 10 | 300°, 299°, 298°, ......,61°, 60° |
| " | 11 | 300°, 299°, 298°, ......, 61°, 60° |
| " | 12 | 300°, 299°, 298°, ......, 61°, 60° |
| " | 7 | |
| " | 131 | |
| " | 9 | 0°, 0°, 0°, ......, 0°, 0° |

Figure 6D:
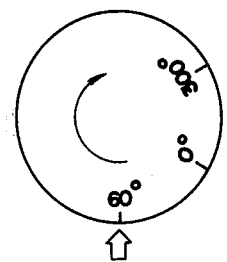

(4) In the case of the clockwise rotation of the table, the start position 60°, and the command position 300°, as shown in FIG. 6D.

| | | (60°) ↓ | | | | | |
|---|---|---|---|---|---|---|---|
| The output of the element | 10 | 420°, 419°, ......, 361°, | 360°, | 359°, | ......, 301°, | 300° |
| " | 11 | 60°, 59°, ......, 1°, | 0° (=360°), | 359°, | ......, 301°, | 300° |
| " | 12 | 420°, 419°, ......, 361°, | 360°, | 359° | ......, 301°, | 300° |
| " | 7 | ⎯⎯⎯⎯⎯⎯⎯⎯⎯⎯⎯⎯⎯⎯⎯⎯⎯⎯⎯⎯⎯⎯ | | | | |
| " | 131 | ⎯⎯⎯⎯⎯⎯⎯⎯⎯⎯⎯⎯⎯⎯⎯⎯ | | | | |
| " | 9 | 360°, 360°, ......, 360°, | 360°, | 360°, | ......, 360°, | 360° |

As stated in the above cases (1) and (4), in the case where the zero mark on the table passes the reference point on the base, a discontinuous angular value from the element 11 is converted to a continuous angular value by the element 12, since in a system for controlling the rotational angular position using a feed back control, both of the outputs of the elements 10 and 11 should be continuous values in order to follow the table to the output of the element 10.

As explained in detail above, the present invention includes a figure zero discrimination circuit for discriminating whether or not a command position of the circular table is such that the output of the position detector passes over the figure zero. In the case where the output of the position detector passes over the figure zero, the angular value of 360° is added to or subtracted from the signal applied to the function generator and the operational comparator which represents the angular value of the starting position of the circular table. In this way, the outputs of the function generator and the operational comparator take continuous values without any sudden changes in the neighbourhood of the figure zero on the position detector, thereby making possible smooth control operation. Further, according to the present invention, provision of the angular converter eliminates the need for any special angle detector but an ordinary decimal position detector suffices, thus simplifying and reducing the cost of the control apparatus. Also, the control apparatus according to the invention is so constructed that each rotation of the circular table corresponds to $10^n$ ($n = 1, 2, 3, \ldots, n$) of the output of an ordinary decimal position detector, thereby permitting limitless rotational control of the circular table.

We claim:

1. A position control apparatus for a circular table used with machine tools and the like, comprising a start position register for storing a starting position of the table, a figure zero discrimination circuit for comparing the starting position with a command position produced from a command register, said figure zero discrimination circuit discriminating whether or not said command position is such that the output of an absolute position detector for the table passes over figure zero, an angular converter for converting the output of the absolute position detector into an angular value output, an operational comparator for causing an angular value of 360° to be added to or subtracted from the angular value output of said angular converter in the presence of the output of said figure zero discrimination circuit, said operational comparator producing the angular value output of said angular converter in the absence of the output from said figure zero discrimination circuit, a 360° register for storing data representing the angular value of 360° used for said addition to or subtraction from the angular value of the starting position of said circular table, said addition or subtraction being performed in a function generator and said operational comparator, said apparatus operating in such a manner that the sudden change in the values which occur when the output of said absolute position detector passes over the figure zero is processed as smoothly as if continuous numerical values are involved.

2. A position control apparatus according to claim 1, wherein before the angular value output of said angular converter passes over said figure zero, said operational comparator applies to said subtractor a value obtained by adding 360° to the output of said angular converter when the command position involves clockwise rotation, and a value obtained by subtracting 360° from the output of said angular converter when the command position involves counterclockwise rotation, said operational comparator applying the output of said angular converter direct to a subtractor without any addition or subtraction when the output of said angular converter passes over said figure zero.

3. A position control apparatus according to claim 1, wherein said angular converter includes a first register for storing the output of said absolute position detector, a converter for converting a numerical value produced from said first register into a binary value, a second register for storing the output of said converter, a third register for storing an angular conversion factor, a multiplier for multiplying said binary value produced from said second register by the factor produced from said third register, and a fourth register for storing the output of said multiplier and producing said output of said multiplier as an angular value to the operational comparator.

* * * * *